Oct. 12, 1943.   J. J. JAKOSKY   2,331,324
METHOD OF AND APPARATUS FOR MAKING RIVETS
Filed May 4, 1942          2 Sheets-Sheet 1

INVENTOR.

Oct. 12, 1943.  J. J. JAKOSKY  2,331,324
METHOD OF AND APPARATUS FOR MAKING RIVETS
Filed May 4, 1942  2 Sheets-Sheet 2

John Jay Jakosky
INVENTOR.

Patented Oct. 12, 1943

2,331,324

UNITED STATES PATENT OFFICE 2,331,324

METHOD OF AND APPARATUS FOR MAKING RIVETS

John Jay Jakosky, Lawrence, Kans.

Application May 4, 1942, Serial No. 441,589

10 Claims. (Cl. 10—26)

This invention relates to riveting and in particular to a method of and apparatus for manufacturing a certain type of rivet.

In a co-pending application filed August 13, 1941, Serial Number 406,729, I have described a method of riveting by use of internally applied hydraulic pressure, and various types of rivet that may be usable therefor. This invention is concerned with an improved type of rivet for use with the method of the co-pending case.

An important object of this present invention is to provide an improved type of hydraulic rivet, all sizes of which require the same hydraulic pressure for expansion, with a resultant uniformity of operation techniques and equipment when used in large-scale production.

Another important object is to provide an improved type of hydraulic rivet, all sizes of which require the same thrust or force against the rivet head to properly effect a seal between the rivet and the hydraulic pressure producing device, which also results in a uniformity of use and operating technique.

A further object of this invention is to provide an improved type of rivet requiring a low thrust or force against the rivet head, thereby preventing mechanical injury to light structural members which may be undergoing a riveting operation.

Still another important object of the invention is to provide an improved type of hydraulic rivet having a low wind resistance due to the small opening or duct in the head of the rivet.

Another object of this invention is to provide an improved method of manufacture whereby rivets of any size may be constructed, each size having any desired bore and any desired area of opening or duct, said bore and duct being independent of each other in size.

Another important object of the invention is to allow high hydraulic pressures to be employed for expansion of rivets made from structural materials having a high yield point, without requiring an excessive thrust or force between the rivet and a pressure gun employing a tapered nozzle.

Another object of the present invention is to provide an improved type of hydraulic rivet giving a combination of the above mentioned features and which may be manufactured at a low cost, thereby allowing large-scale use and production of this rivet.

The nature of this invention will be readily understood from the following description, if read in conjunction with the accompanying drawings, and the novel features will be particularly described in the appended claims.

In the drawings which form a part of the specification and are to be read in conjunction therewith:

Figure 1:
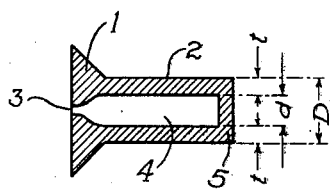
Figure 1 illustrates a preferred type of rivet produced according to this invention. This illustration shows the adaptation of this invention to the counter-sunk type of rivet head.

Figure 1 is a preferred embodiment of the invention, as applied to the counter-sunk type of rivet, 1. The pressure necessary to expand the shank 2 is comparable to that required for any similar tubular member. If end-effects are neglected, the expansion pressure for circumferential expansion may be represented by the formula:

$$S_c = \frac{Pd}{2t}$$

from which it is evident that $$P = \frac{2S_c t}{d} = 2S_c \frac{t}{d}$$

wherein $S_c$ equals the circumferential stress or strain in the metal, P represents the pressure in pounds per square inch, $d$ the internal bore or diameter of the chamber within the rivet, $t$ represents the wall thickness of the shank and D represents the outside diameter of the rivet.

Thus the expansion pressure is a function of the ratio of $t/d$, and as long as a constant ratio of these quantities is maintained the pressure required to expand any given material is a constant quantity, regardless of the size of the rivet. The general magnitude of the expansion pressure may be obtained by analyzing a specific size rivet. By way of illustration, consider a rivet having $D=\frac{1}{4}$ inch, with a bore or chamber of $d=\frac{1}{8}$ inch, and made from an alloy material having a value of $S_c=24,000$. From the foregoing equations $$P = \frac{2 \times 24,000 \times .0625}{.125} = 24,000 \text{ lbs./sq. inch}$$

In practice, this value of 24,000 pounds per square inch may be somewhat increased or decreased.

The type of rivet, as illustrated in Figure 1, is provided with a duct 3 which passes through the head 1 and connects with a chamber 4, preferably of larger diameter, and extending coaxially into the shank 2 of the rivet. This chamber normally should extend into the shank a distance which will allow the closed end 5 to have a thickness only sufficient to resist undue distortion or breakage at the end of the rivet prior to complete expansion of the shank when the hydraulic pressure is applied.

Figure 2:
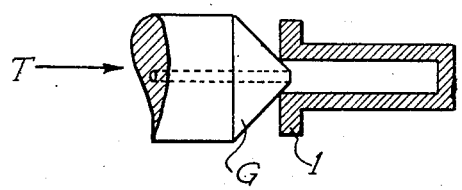
Figure 2 illustrates a means for creating the internal hydraulic pressure, by use of a pressure gun equipped with a tapered nozzle.

As described in my co-pending application, the preferred method of expanding these rivets is by use of a hydraulic gun provided with a tapered nozzle. Referring to Figure 2, the hydraulic gun is provided with a nozzle G, the end of which is held against the diagrammatically represented rivet head 1 by a thrust or force T. The thrust necessary to maintain the rivet in sealing contact with the head must be greater than the force against that portion of the nozzle which is exposed to the pressure of the fluid in the rivet. This latter thrust is equal to the area of that portion of the gun multiplied by the pressure, that is $$T > PA$$

or $$T > P\left(\frac{\pi}{4}d^2\right)$$

The magnitude of this force may be determined from these relationships, using the expanding pressure of 24,000 pounds per square inch determined above. If we momentarily consider a non-preferred design having an opening through the head of the same size as the bore in the shank, and with a value of $\frac{1}{8}$ inch, we obtain the following value for the thrust:

$$T > 24,000\left[\frac{\pi}{4}\left(\frac{1}{8}\right)2\right] = 294 \text{ lbs. thrust}$$

Obviously, a thrust of 294 pounds is greater than could be exerted by an average workman, especially under the cramped and inconvenient positions often necessary in air-craft production. This thrust is also greater than could be borne by many of the structural members of an air-craft during assembly and manufacture. Therefore, in order to utilize rivets made of the harder, commercially used metals, such as a material having a yield point of 24,000 lbs. per square inch, it is necessary that some arrangement be utilized to allow less thrust or mechanical force to seal the gun tip against the rivet head. A lower value of T can only be obtained by use of a smaller diameter hole or duct through the head of the rivet.

When the hydraulic rivet is formed or manufactured merely by drilling a hole of uniform diameter through the head of the rivet and into the shank, the smaller the diameter of the hole or bore, the less will be the area of the hole and the lower would be the thrust. To offset this advantage, however, is the condition that the smaller the diameter of the hole, the greater is the thickness of wall, with a resultant greater required pressure for expansion of the rivet. Therefore, it is found in practice that when the diameter of the hole through the head and into the shank of the rivet is of uniform diameter, adequate materials cannot be expanded without an excessive thrust against the head of the rivet. In order to expand such materials, I have proposed in my co-pending application, that the opening into the chamber within the rivet be smaller than the cross-section of the chamber in order to effect proper seal with the rivet head.

The improved design shown in Figure 1, embodying the use of a small head or opening duct and a larger shank bore, and the method of obtaining same, is the essence of this invention.

In practice it has been found that the average workman can momentarily apply a thrust of 50 pounds without undue fatigue. In mass production, however, where cramped operating conditions usually prevail, it is deemed desirable to maintain a thrust having a value of about thirty pounds. It may be necessary to use pressures of the order of 24,000 pounds per square inch hydraulic pressure for expansion of the rivet. This requires an area of the duct of .00125 square inch or a duct having a diameter slightly less than $\frac{1}{32}$ of an inch.

When an attempt is made to produce a rivet having an outside diameter of $\frac{1}{4}$ inch, having a duct approximately $\frac{1}{32}$ of an inch in diameter, with an internal bore of $\frac{1}{8}$ inch, very special undercutting tools are required, together with painstaking efforts and high skill. These time-consuming operations are not practical for the commercial production of such rivets.

Figure 3:
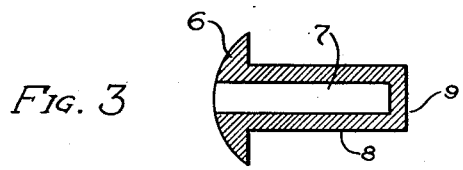
Figure 3 illustrates a conventional Brazier head rivet blank, drilled with a uniform bore.

Rivets produced according to one form of this invention may be manufactured from standard rivets now on the market. In Figure 3 is illustrated a conventional round head rivet 6 which has been bored with a longitudinal or coaxial hole 7, having a diameter of approximately one-half the outside diameter of the shank 8. This bore extends into the rivet to a depth sufficient to produce the maximum expandible portion but allows sufficient metal at the end 9 to prevent undesirable distortion of the end when the internal hydraulic pressure is applied. After boring, the rivet is ready for its next operation which is essentially that of partially closing the head opening to form a duct of the desired area or diameter through the head. This may be accomplished by numerous procedures, among which may be mentioned: (a) spinning, whereby a rolling or other contact member exerts mechanical pressure against the head of the rotating rivet and causes the metal to flow into and to partially close the bore to form a smaller duct at and adjacent the zone of contact, and (b) a stamping, forming or pressing operation, whereby a contact member or die exerts sufficient mechanical pressure against the head of the rivet, and causes the metal to flow and partially close the bore to form a smaller duct.

Figure 4:
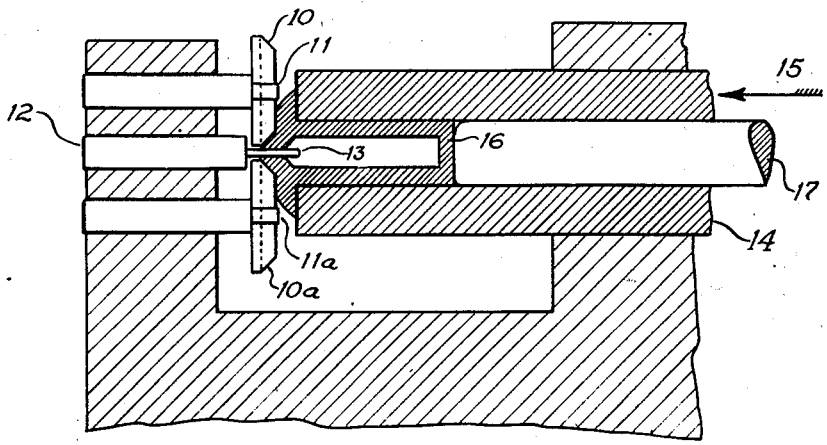
Figure 4 is a sectional view showing means for spinning or rolling one form of head embodying the present invention on the rivet-blank shown in Figure 3.

One type of apparatus for the spinning or rolling operation is illustrated diagrammatically in Figure 4, and comprises essentially two contact wheels 10 and 10a, mounted on low friction, preferably ball-bearing, supports 11 and 11a. In line with the axis of rotation of the pressure wheels 10 and 10a is a mandrel 12, provided with an extension or pin 13 for sizing the duct. A standard rivet of nearly any of the conventional types may therefore be held in a rotating shaft 14 which is movable in an axial direction as indicated by the arrow 15. The manufacture of a rivet in accordance with this technique is substantially as follows: The rivet 6 is first bored as illustrated in Figure 3. The shaft 14 is moved to a position to the right so as to disengage the wheels 10 and 10a. The rivet is now inserted in the socket 16, positioned coaxially in the end of the shaft 14. The shaft is now started to spinning and is slowly moved to the left to engage the roller or forming mechanism. During the spinning process the wheels 10 and 10a reform the ductile metal of the rivet head into the shape shown by the cross-sectioned rivet in Fig. 4. After the shaft 14 has had the desired travel toward the forming mechanism, it is returned to its initial starting position and the rivet is ejected by the pin 17. Another rivet is now inserted into the socket 16 and the operation repeated. Rivets so formed have a small protuberance or tip on their head.

Figure 5:
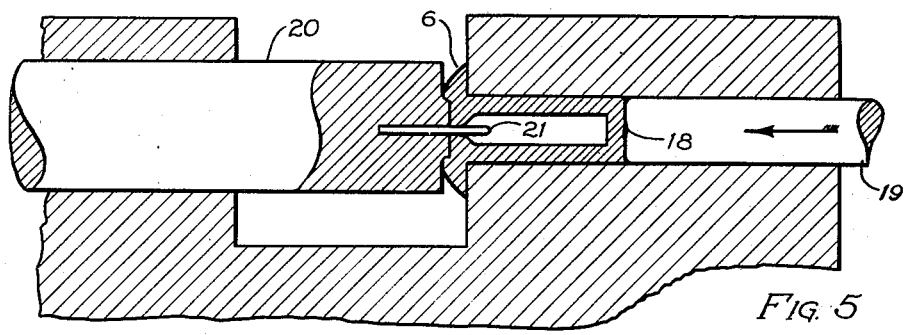
Figure 5 is a sectional view showing a means for pressing or moulding another form of head embodying the present invention on the rivet blank shown in Figure 3.

A second method of producing a rivet having any desired bore and duct areas, utilizes a pressing or forming operation, as illustrated in Figure 5. For this technique a rivet 6, drilled with the desired bore, is inserted in the housing or socket 18. A pin 19 is positioned to give the proper depth and serves as an ejecting pin. The mandrel 20, of the general shape illustrated and provided with a pin or extension 21, is now firmly pressed into the rivet head with sufficient force to cause the metal to flow and assume the configuration shown. The mandrel is now disengaged from the rivet sufficiently to allow the formed rivet to be ejected by movement of pin 19 towards the left. After ejection the pin 19 is returned to its initial position governed by the desired length of the finished rivet and a new rivet is inserted for a repetition of the cycle. Rivets so formed have a small indentation or crater in their head.

Figure 6:
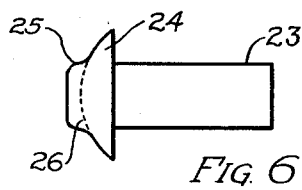
Figure 6 is a view showing a preferred type of rivet-blank for producing rivets.

The rivet-manufacturing technique or procedures illustrated in connection with Figures 4 and 5, are able to utilize a majority of the conventional rivet shapes on the market. Rivets of this type are mechanically satisfactory when used in shear. Oftentimes, however, these rivets may not be strong enough in tension, due to the fact that the effective depth of the head has been decreased by the deforming operation. In addition, both of these procedures produce a rivet with a deformed head which is often undesirable because of trade practices. Also, in many cases for aeronautical use the deformed head is a further disadvantage due to the increased wind resistance of the deformed head as compared to the more stream-lined shapes. For these reasons it is preferable to employ a rivet having a special shaped head for the manufacturing process, but which after deforming produces a head of normal contour that may be made identical to the conventional heads. The wind resistance of this special rivet is particularly satisfactory due to its stream-lined shape. The small hole or duct in the head produces a minimum of eddy-current or disturbance when used in aircraft. A preferred design of rivet therefore, is manufactured from a rivet blank of the general shape shown in Figure 6, wherein 23 denotes the shank of the rivet and 24 the head. This head of the rivet is formed with a protuberance 25 which projects above the normal contour of the conventional rivet, as shown by the dotted line 26. The exact size and geometrical configuration of this protuberance is determined by experimentation. Rivet blanks with this special protuberance are formed on header machines in the same manner as the conventional rivets, the only difference being the shape of the die forming the head.

Figure 7:
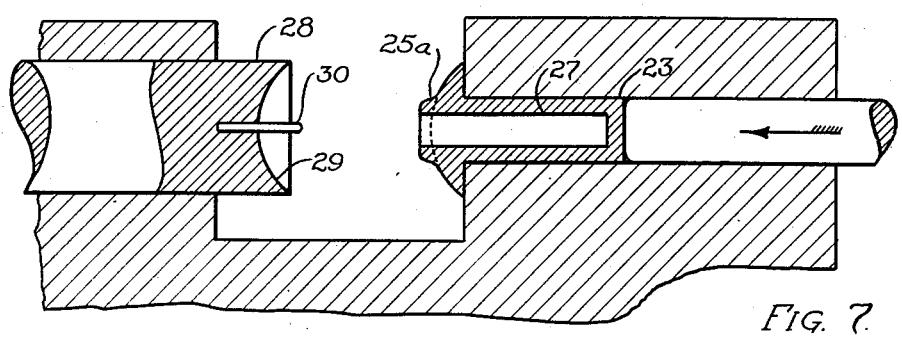
Figure 7 is a sectional view showing means for forming the desired head on the rivet, when using the preferred rivet-blank shown in Figure 6.

The use of these special rivet-blanks is illustrated in connection with Figure 7. Coincident with the heading operation, a hole 27, if not of too great depth is intruded into the rivet, or else is drilled to the desired depth. The diameter of the hole 27 may be of any desired value, usually from 0.3 to 0.6 the diameter of the shank 23. Due to the practical relationship between the expansion pressure and the shear value, the diameter should preferably be 0.5 the diameter of the shank.

The final deforming of the head involves the spinning, pressing, or molding of the remaining portion of the protuberance 25a until it preferably is flush and stream-lined with the normal contour of the head. This may be accomplished by either of the techniques illustrated in Figures 4 or 5. Figure 7 illustrates a preferred shape of die 28, having a smooth contoured cavity 29. A projection pin 30, having the diameter of the desired duct through the head, is provided in the die. By means of mechanical leverage or hydraulic power, the die is pressed into the exposed portion of the head until the latter assumes the desired shape 31, as depicted in Figure 8.

Figure 8:
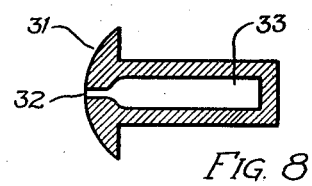
Figure 8 is a sectional view showing the final shape of one preferred type of rivet.

The final rivet illustrated in Figure 8 has the desired streamlined head, a small duct or opening of about $\frac{1}{32}''$ diameter through the head, and a larger bore of about ½ the shank diameter through the main body or shank of the rivet. The size of the duct is controlled by the pin 30 of Figure 7, and the size of the bore in the shank being the hole initially pressed or drilled into the rivet, as described in connection with Figure 7. The sizes of the bore and of the duct being entirely independent of each other and varied as desired.

While I have described my invention in detail in its present preferred embodiment, it will be obvious to those skilled in the art, after understanding my invention, that various changes and modifications may be made therein without departing from the spirit or scope thereof. The appended claims are intended to cover all such modifications and changes.

I claim:

1. The method of making an integral hydraulically-expandible rivet which consists in forming from material capable of developing a permanent set, a rivet blank having a head, a shank, and an opening of substantially uniform cross-section extending through the head to a point adjacent the end of the shank to provide a shank having an expansion chamber with a closed end, and subsequently flowing the material of the head toward the longitudinal axis of the rivet to provide a duct communicating with the expansion chamber, the area of the cross-section of the duct being less than the area of the cross-section of the chamber.

2. The method of making an integral hydraulically-expandible rivet which consists in forming from material capable of developing a permanent set, a rivet blank having a head, a shank, and an opening of substantially uniform cross-section extending through the head to a point adjacent the end of the shank to provide a shank having an expansion chamber with a closed end, subsequently flowing the material of the head toward the longitudinal axis of the rivet to provide a duct communicating with the expansion chamber, the area of the cross-section of the duct being less than the area of the cross-section of the chamber, and stopping the flow of the material when the duct is of a predetermined size.

3. The method of making an integral hydraulically-expandible rivet which consists in forming from material capable of developing a permanent set, a rivet blank having a head, a shank, and an opening of substantially uniform cross-section extending through the head to a point adjacent the end of the shank to provide a shank having an expansion chamber with a closed end and subsequently spinning the material of the head toward the longitudinal axis of the rivet to provide a duct communicating with the expansion chamber, the area of the cross-section of the duct being less than the area of the cross-section of the chamber.

4. The method of making an integral hydraulically-expandible rivet which consists in forming from material capable of developing a permanent set, a rivet blank having a head, a shank and an opening of substantially uniform cross-section extending through the head to a point adjacent the end of the shank to provide a shank having an expansion chamber with a closed end, and subsequently applying pressure to the head of the rivet about the opening to flow the material of the head toward the central longitudinal axis of the rivet to provide a duct communicating with the expansion chamber, the area of the cross-section of the duct being less than the area of the cross-section of the chamber.

5. The method of making an integral hydraulically-expandible rivet which consists in forming from material adapted to develop a permanent set, a rivet blank having a head, a shank, and an opening of substantially uniform cross-section extending through the head to a point adjacent the end of the shank to provide a shank having an expansion chamber with a closed end, holding a sizing pin in said opening and flowing the material of the head against said sizing pin, the cross-sectional area of the sizing pin being less than the cross-sectional area of the chamber.

6. Rivet making apparatus comprising in combination means for holding a hollow rivet blank, means for flowing the material of the head of said rivet blank toward the axis of the rivet, and a sizing pin carried by the flowing means adapted to enter the opening in the rivet blank when the flowing means is in operative position to limit the flow of the material and to provide a chamber of relatively large cross-section and a duct of relatively small cross-section communicating with the chamber.

7. Rivet making apparatus comprising in combination means for holding a hollow rivet blank, forming means, means for rotating one of said means with respect to the other to deform the material of the head of the rivet toward the longitudinal axis thereof and means for limiting the amount of said deformation to provide a duct communicating with the interior of the rivet, the cross-sectional area of said duct being less than the cross-sectional area of the remainder of the opening in the rivet.

8. Rivet making apparatus comprising in combination means for holding a hollow rivet blank having a head, a punch for flowing the material of the head toward the longitudinal axis of the rivet blank and a pin carried by the punch, the pin being located substantially coaxial with the blank to limit the flow of material of the head toward the axis of the rivet.

9. The method of manufacturing a rivet of the type described comprising the steps of forming an integral rivet with a head, a shank, and a chamber extending through the head and coaxially into the shank, flowing the material of the head to form a hydraulic sealing surface on the outside of the head and to partially close the opening through the head to form a duct communicating with the chamber and of smaller cross-sectional area than the cross-sectional area of the chamber.

10. The method of manufacturing a rivet of the type described comprising the steps of forming a rivet blank with a shank, a head having a co-axial protuberance on the side opposite the shank, and a chamber extending through the protuberance and head into the shank, and thereafter flowing the material of said protuberance into a sealing surface and to constrict the entrance to said chamber.

JOHN JAY JAKOSKY